United States Patent
Wu et al.

(10) Patent No.: US 11,888,918 B2
(45) Date of Patent: Jan. 30, 2024

(54) METHOD AND CONFERENCE SYSTEM CAPABLE OF EXPANDING FUNCTIONS OF THE CONFERENCE SYSTEM BY USING ADDITIONAL CIRCUIT BOARD

(71) Applicant: BENQ CORPORATION, Taipei (TW)

(72) Inventors: Chen-Chi Wu, Taipei (TW); Chia-Nan Shih, Taipei (TW); Chin-Fu Chiang, Taipei (TW); Jung-Kun Tseng, Taipei (TW); Chuang-Wei Wu, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 17/852,346

(22) Filed: Jun. 28, 2022

(65) Prior Publication Data

US 2022/0417312 A1 Dec. 29, 2022

(30) Foreign Application Priority Data

Jun. 29, 2021 (TW) .................................. 110123682

(51) Int. Cl.
*H04L 65/75* (2022.01)
*H04L 65/403* (2022.01)

(52) U.S. Cl.
CPC .......... *H04L 65/765* (2022.05); *H04L 65/403* (2013.01)

(58) Field of Classification Search
CPC ............................ H04L 65/765; H04L 65/403
USPC ........................................................ 709/204
See application file for complete search history.

(56) References Cited

U.S. PATENT DOCUMENTS

| | | | | |
|---|---|---|---|---|
| 9,848,167 B1* | 12/2017 | Christian | ............... | H04N 7/142 |
| 2003/0017846 A1* | 1/2003 | Estevez | ............... | H04L 63/0428 |
| | | | | 455/556.1 |
| 2007/0073843 A1* | 3/2007 | Ferreri | ............... | H04N 21/4227 |
| | | | | 348/E7.071 |
| 2008/0058011 A1* | 3/2008 | Lin | ........................ | H04B 1/04 |
| | | | | 455/557 |
| 2009/0153750 A1* | 6/2009 | Tsunashima | ......... | H04N 9/3179 |
| | | | | 348/744 |
| 2009/0193452 A1* | 7/2009 | Russ | ................ | H04N 21/43637 |
| | | | | 725/38 |
| 2020/0366864 A1* | 11/2020 | Huang | ............. | H04N 21/42204 |

* cited by examiner

*Primary Examiner* — Nicholas R Taylor
*Assistant Examiner* — Chong G Kim

(57) ABSTRACT

A method for expanding functions of a conference system includes providing a first circuit board and a second circuit board disposed in the receiver, receiving a first wireless packet transmitted from the first transmitter merely through a second communication module of the second circuit board, controlling the second communication module for performing an unpacking process of the first wireless packet by a second processor of the second circuit board to generate first compressed media data, generating a first command signal by the second processor of the second circuit board for controlling a first processor of the first circuit board to receive the first compressed media data through a data channel, and decompressing the first compressed media data by the first processor for acquiring first media contents of the first transmitter.

18 Claims, 5 Drawing Sheets

METHOD AND CONFERENCE SYSTEM CAPABLE OF EXPANDING FUNCTIONS OF THE CONFERENCE SYSTEM BY USING ADDITIONAL CIRCUIT BOARD

BACKGROUND OF THE INVENTION

1. Field of the Invention

The present invention illustrates a method for expanding functions of a conference system and a conference system capable of expanding functions, and more particularly, a method and a system capable of expanding functions by using additional circuit board.

2. Description of the Prior Art

With the rapid development of science and technology, various projector systems and conference reporting systems have been adopted in our daily life. The conference reporting system can be integrated with a projector system for increasing the operational convenience of a presenter when data is presented. Currently, the conference reporting system uses wireless or wired communications for transmitting data to a display device. The data communications method can be categorized into two modes. In a first mode, specific software has to be installed in computers operated by members participating in a conference meeting. The computer can identify several hardware components such as a hard disk, a universal serial bus (USB), and a CD-ROM device. Then, data saved in previously mentioned physical or virtual storage devices can be transmitted to a screen or display device through a wireless network. In a second mode, the computers operated by the members participating in the conference meeting can be linked to transmitters. The transmitters are linked to the screen or display device through a receiver. Therefore, after the computers are linked to transmitters, the data of the computer can be displayed on the screen or display device through the receiver. In recent years, the conference reporting system can use wireless communications technologies for increasing operation efficiency.

However, a hardware specification of the receiver has to meet a predetermined standard design, such as being thin, light, and power efficient. Thus, the hardware functions of the receiver are limited by its original hardware standard. When a user desires to expand functions of the receiver, circuits and chips of the receiver have to be redesigned. In other words, the receiver cannot simply expand the functions according to the original hardware circuits. Since the hardware circuits of the receiver have to be redesigned, it results in high cost and extra fabrication time. Therefore, to develop a receiver capable of expanding hardware functions is an important issue.

SUMMARY OF THE INVENTION

In an embodiment of the present invention, a method for expanding functions of a conference system is disclosed. The conference system comprises a first transmitter and a receiver coupled to the first transmitter. The method comprises providing a first circuit board and a second circuit board disposed in the receiver, receiving a first wireless packet transmitted from the first transmitter merely through a second communication module of the second circuit board, controlling the second communication module for performing an unpacking process of the first wireless packet by a second processor of the second circuit board to generate first compressed media data, generating a first command signal by the second processor of the second circuit board for controlling a first processor of the first circuit board to receive the first compressed media data through a data channel, and decompressing the first compressed media data by the first processor for acquiring first media contents of the first transmitter. The first circuit board and the second circuit board are two separate circuit boards before being coupled.

In another embodiment of the present invention, a conference system capable of expanding functions is disclosed. The conference system comprises a first circuit board, a second circuit board coupled to the first circuit board, the second circuit board, and a first transmitter. The first circuit board comprises a first processor. The second circuit board is coupled to the first circuit board. The second circuit board comprises a second communication module and a second processor coupled to the second communication module. The first transmitter is coupled to the second circuit board. The first circuit board and the second circuit board are disposed in a receiver. The second circuit board receives a first wireless packet transmitted from the first transmitter merely through a second communication module. The second processor of the second circuit board controls the second communication module for performing an unpacking process of the first wireless packet to generate first compressed media data. The second processor of the second circuit board generates a first command signal for controlling the first processor of the first circuit board to receive the first compressed media data through a data channel. The first processor decompresses the first compressed media data for acquiring first media contents of the first transmitter. The first circuit board and the second circuit board are two separate circuit boards before being coupled.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
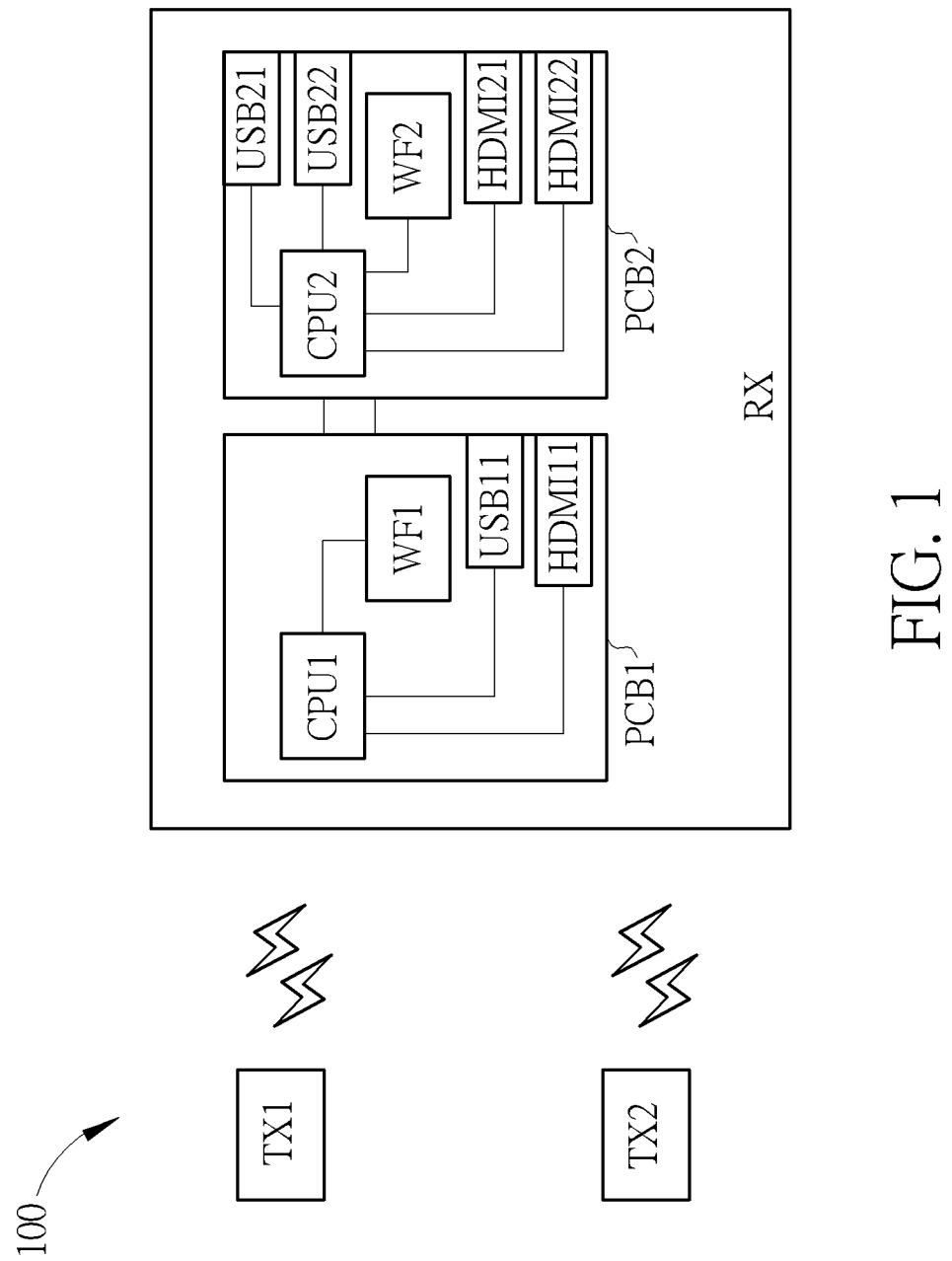
FIG. 1 is a block diagram of a conference system capable of expanding functions according to an embodiment of the present invention.

FIG. 1 is a block diagram of a conference system 100 capable of expanding functions according to an embodiment of the present invention. The conference system 100 includes a first circuit board PCB1, a second circuit board PCB2, and at least one transmitter, such as a first transmitter TX1 and/or a second transmitter TX2. The first circuit board PCB1 can include a first processor CPU1 and a first communication module WF1. The first communication module WF1 can be a wireless communication module (i.e., such as a wireless fidelity (Wi-Fi) module or a Bluetooth module) for receiving wireless signals. The first processor CPU1 is coupled to the first communication module WF1. The second circuit board PCB2 is coupled to the first circuit board PCB1. The second circuit board PCB2 can include a second communication module WF2 and a second processor CPU2. The second processor CPU2 is coupled to the second communication module WF2. The second communication module WF2 can be a wireless communication module for receiving wireless signals. Further, the first communication module WF1 of the first circuit board PCB1 supports a first wireless communication specification. The second communication module WF2 of the second circuit board PBC2 supports a second wireless communication specification. The first wireless communication specification and the second wireless communication specification can be two different communication standards under the same communication protocol. For example, the second wireless communication specification can be a wireless fidelity protocol with sixth-generation specification standard (Wi-Fi 6). The first wireless communication specification can be a wireless fidelity protocol with fifth-generation specification standard (Wi-Fi 5). Further, bandwidth utilization of the second wireless communication specification is superior to the first wireless communication specification. For example, the wireless fidelity protocol with sixth-generation specification standard is superior to the wireless fidelity protocol with fifth-generation specification standard in communication performance, transmission rate, and anti-noise capability. In the conference system 100, the first circuit board PCB1 can be a circuit board having basic functions. In other words, when the conference system 100 is manufactured, the first circuit board PCB1 is designed as a basic circuit board capable of executing the basic functions. However, as hardware requirements increase, it is insufficient to use the first circuit board PCB1 for performing various hardware functions. For example, the wireless fidelity protocol with sixth-generation specification standard is a trending technology. However, the first circuit board PCB1 only supports the wireless fidelity protocol with fifth-generation specification standard. Therefore, the conference system 100 can introduce the second circuit board PCB2 for performing additional hardware functions. In other words, the second circuit board PCB2 is a circuit board having advanced functions. Further, a clock frequency of the first processor CPU1 is larger than a clock frequency of the second processor CPU2. The second circuit board PCB2 can include a first media output port HDMI21 and a second media output port HDMI22. The first media output port HDMI21 and the second media output port HDMI22 can be high definition multimedia interface (HDMI) output ports. The second circuit board PCB2 can include at least one data output port, such as Universal Serial Bus (USB) output ports USB21 and USB22. Further, the first media output port HDMI21, the second media output port HDMI22, and at least one data output port (USB21 and USB22) of the second circuit board PCB2 are coupled to the second processor CPU2. The first circuit board PCB1 can further include a third media output port HDMI11 and a data output port USB11. The third media output port HDMI11 can be an HDMI output port. The data output port USB11 can be an USB output port. The third media output port HDMI11 and the data output port USB11 are coupled to the first processor CPU1. The first processor CPU1 of the first circuit board PCB1 can communicate with the second processor CPU2 of the second circuit board PCB2 through a command channel and a data channel. Further, the first transmitter TX1 and/or the second transmitter TX2 are coupled to the second circuit board PCB2.

In the conference system 100, the first circuit board PCB1 and the second circuit board PCB2 are disposed in the receiver RX. Further, the second circuit board PCB2 receives a first wireless packet transmitted from the first transmitter TX1 merely through the second communication module WF2. The second processor CPU2 of the second circuit board PCB2 controls the second communication module WF2 for performing an unpacking process of the first wireless packet to generate first compressed media data. Then, the second processor CPU2 of the second circuit PCB2 board can generate a first command signal for controlling the first processor CPU1 of the first circuit board PCB1 to receive the first compressed media data through a data channel. The first processor CPU1 decompresses the first compressed media data for acquiring first media contents of the first transmitter TX1. In other words, in the conference system 100, the first circuit board PCB1 is a basic circuit board for performing basic functions. However, since the second circuit board PCB2 is introduced to assist the first circuit board PCB1 for expanding hardware functions, the first processor CPU1 of the first circuit board PCB1 only executes a data decompressing operation. Thus, even if the first processor CPU1 is designed for executing the basic functions, the conference system 100 can still expand hardware functions due to the assistance of the second circuit board PCB2. Further, the first circuit board PCB1 and the second circuit board PCB2 are two separate circuit boards before being coupled. However, in another embodiment, computational capabilities of the first processor CPU1 and the second processor CPU2 can be identical. In another embodiment, a computational capability of the first processor CPU1 is greater than a computational capability of the second processor CPU2. Any reasonable hardware modification falls into the scope of the present invention.

Figure 2:
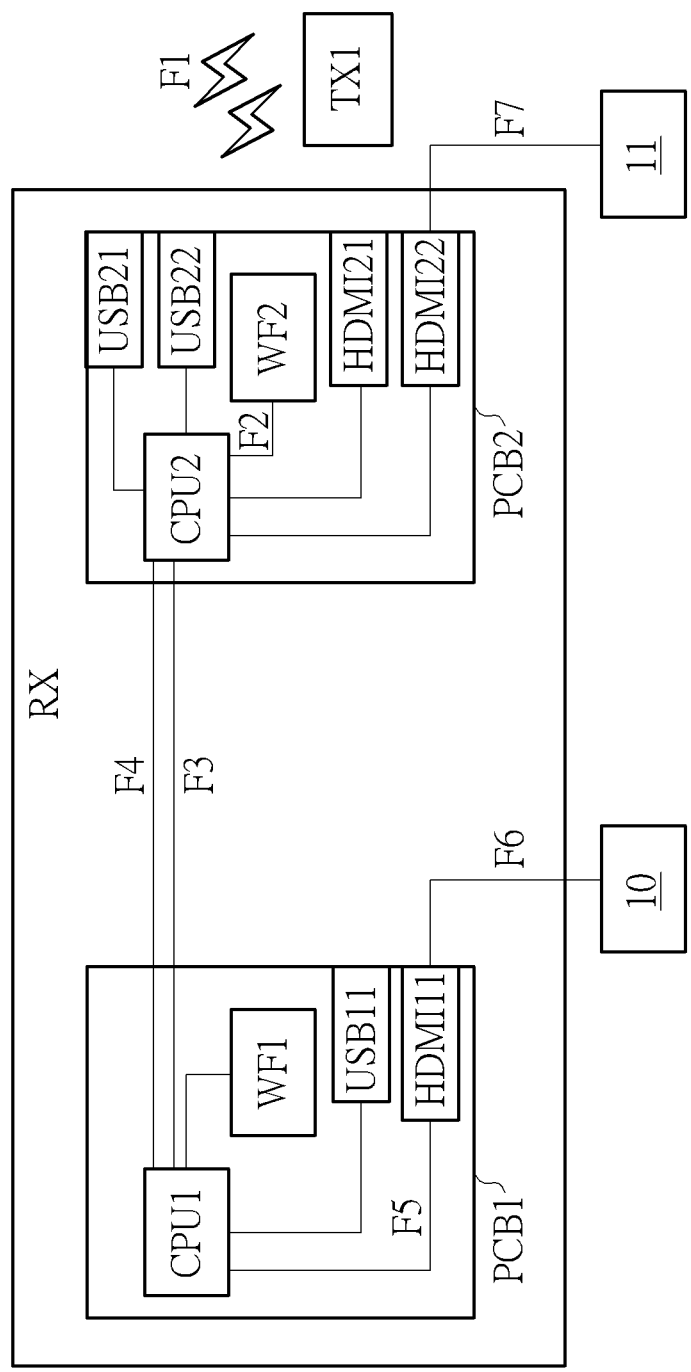
FIG. 2 is an illustration of data transmission of the conference system capable of expanding functions in FIG. 1.

FIG. 2 is an illustration of data transmission of the conference system 100 capable of expanding functions. The first transmitter TX1 can be any communication device for receiving media data transmitted from a media source, such as a computer, a mobile phone, or an audio and video player. The first transmitter TX1 and the computer are two separate devices before being connected. When the first transmitter TX1 is coupled to the computer, the first transmitter TX1 can be used for triggering the computer to transmit the first media data to the first transmitter TX1. Further, information of Extended Display Identification Data (EDID) can also be saved in the first transmitter TX1. Therefore, the first transmitter TX1 can be regarded as a virtual display device. After the first transmitter TX1 receives the first media data, the first media data can be transmitted as a first wireless packet to the receiver RX through a data path F1 by using a wireless network. As previously mentioned, the receiver RX has the first circuit board PCB1 and the second circuit board PCB2. The second processor CPU2 of the receiver RX can control the second communication module WF2 for receiving the first wireless packet corresponding to the first media data transmitted from the first transmitter TX1 through a data path F2. The first wireless packet can include first configuration information (i.e., header information) of the first wireless packet and first compressed media data. The second processor CPU2 of the receiver RX can also control the second communication module WF2 for executing an unpacking process to the first wireless packet through the data path F2. After the first wireless packet is unpacked, the second processor CPU2 can extract the first compressed media data from the first wireless packet. After the first compressed media data is acquired, the second processor CPU2 of the second circuit board PCB2 can transmit a first command signal to the first processor CPU1 of the first circuit board PCB1 through the data path F3. Here, the data path F3 can be regarded as the first command channel. After the first command signal is received by the first processor CPU1, the first processor CPU1 can receive the first compressed media data through the data path F4. Here, the data path F4 can be regarded as a data channel. After the first processor CPU1 receives the first compressed media data, the first processor CPU1 can decompress and decode the first compressed media data for acquiring first media contents. Finally, the first processor CPU1 can transmit the first media contents to the first display 10 through the data path F5 and the data path F6. Alternatively, the first processor CPU1 can transmit the first media contents to the second circuit board PCB2 through the data path F4. Then, the second processor CPU2 of the second circuit board PCB2 can transmit the first media contents to the second display 11 through the data path F7. Any reasonable hardware modification falls into the scope of the present invention. For example, the first media contents of the first transmitter TX1 can also be wirelessly broadcasted by using the second communication module WF2 through an application program. Alternatively, the conference system 100 can also enable an online conference mode for composing, integrating, or displaying media contents of at least two transmitters. Alternatively, the conference system 100 can also introduce a plurality of receivers. The plurality of receivers can be interconnected with each other through a network. For example, the first media data of the transmitter TX1 can be shared with another receiver through the second communication module WF2. Particularly, the connection mode of two receivers can be a Wi-Fi direct connection mode or a point-to-point internet protocol (IP) address direct connection mode.

In the conference system 100, the receiver RX can be coupled to a plurality of transmitters. For example, the receiver RX can be coupled to the first transmitter TX1 and the second transmitter TX2 at the same time. Operations between the second transmitter TX2 and the receiver RX are similar to operations between the first transmitter TX1 and the receiver RX, as described below. The second circuit board PCB2 receives a second wireless packet transmitted from the second transmitter TX2 merely through the second communication module WF2. The second processor CPU2 of the second circuit board PCB2 controls the second communication module WF2 for performing the unpacking process of the second wireless packet to generate second compressed media data. Then, the second processor CPU2 of the second circuit board PCB2 generates a second command signal for controlling the first processor CPU1 of the first circuit board PCB1 to receive the second compressed media data through the data channel. Then, the first processor CPU can decompress and decode the second compressed media data for acquiring second media contents of the second transmitter. In other words, in the conference system 100, the first circuit board PCB1 is the basic circuit board for performing basic functions. However, since the second circuit board PCB2 is introduced to assist the first circuit board PCB1 for expanding hardware functions, the first processor CPU1 of the first circuit board PCB1 only executes a data decompressing operation. Thus, even if the first processor CPU1 is designed for executing the basic functions, the conference system 100 can still expand hardware functions due to the assistance of the second circuit board PCB2.

Further, after the first media contents and the second media contents are received by the conference system 100, an image splitting/composing process can be executed for generating composite media contents, as illustrated below. As previously mentioned, the first media contents and the second media contents can be acquired by the first processor CPU1 after the first processor CPU1 executes a decompressing process and a decoding process. In a first mode, the first processor CPU1 can execute the image splitting/composing process for generating the composite media contents according to the first media contents and the second media contents after the first processor CPU1 receives the first media contents and the second media contents. In other words, in the first mode, the image splitting/composing process is performed by the first processor CPU1. However, although the computational capability of the first processor CPU1 is insufficient, the second processor CPU2 can be introduced for assisting the first processor CPU1 to execute the image splitting/composing process. In a second mode, the first processor CPU1 transmits the first media contents and the second media contents to the second processor CPU2 after the first processor CPU1 receives the first media contents and the second media contents. The second processor CPU2 can execute the image splitting/composing process for generating the composite media contents according to the first media contents and the second media contents after the second processor CPU2 receives the first media contents and the second media contents. In other words, in the second mode, the image splitting/composing process is performed by the second processor CPU2. Further, the first processor CPU1 and the second processor CPU2 of the conference system 100 can perform different operations independently, or can perform one operation cooperatively. Any technology modification falls into the scope of the present invention. For example, the first circuit board PCB1 is not compatible with a wireless communication function. The conference system 100 can use the second communication module WF2 of the second circuit board PCB2 for accessing wireless data. The first media contents and the second media contents can also be wirelessly broadcasted by using the second communication module WF2 through an application program. Alternatively, the conference system 100 can also enable the online conference mode for composing, integrating, or displaying media contents of at least two transmitters. Alternatively, the conference system 100 can also introduce the plurality of receivers. The plurality of receivers can be interconnected with each other through a network. For example, the first media contents and the second media contents can be transmitted to another receiver through the second communication module WF2. Particularly, the connection mode of the two receivers can be the Wi-Fi direct connection mode or the point-to-point internet protocol (IP) address direct connection mode. The conference system 100 can perform a video and audio separation process. For example, a sound effect of the first media contents and the second media contents can be processed by the second processor CPU2. Then, the processed sound effect data can be transmitted to the display through a port. For example, the processed sound effect data can be transmitted to the second display 11 coupled to the second media output port HDMI22 by the second processor CPU2 for providing the sound of the output image. Alternatively, the processed sound effect data can be further transmitted to the first processor CPU1 by the second processor CPU2. Therefore, the first processor CPU1 can transmit the processed sound effect data to the first display 10 coupled to the third media output port HDMI11 for providing the sound of the output image. Further, the conference system 100 can determine if the sound effect data is outputted according to the output image (i.e., provided by the first transmitter TX1, the second transmitter TX2, or both the first transmitter TX1 and the second transmitter TX2). Alternatively, the conference system 100 can also determine if the sound effect data is outputted according to a sound effect mode.

Figure 3:
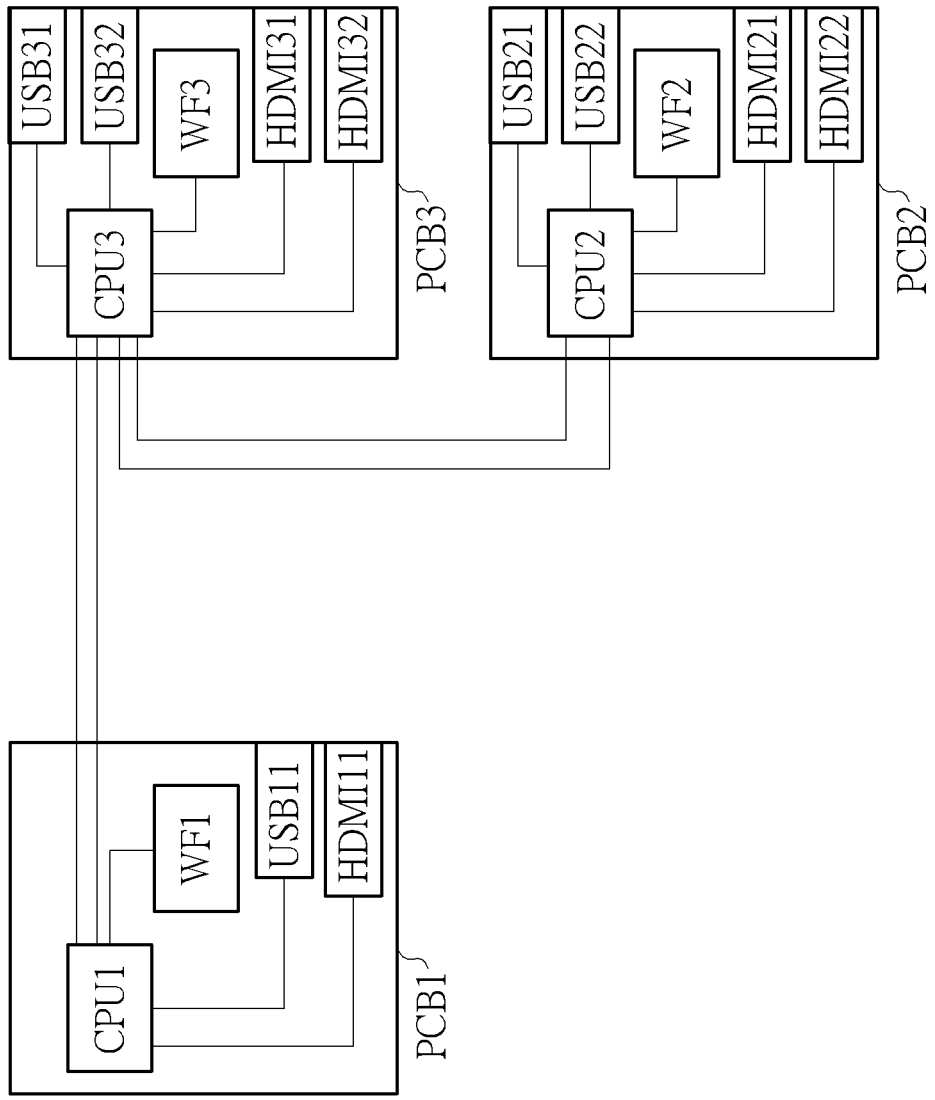
FIG. 3 is an illustration of a first data transmission mode of the conference system capable of expanding functions by introducing additional circuit board in FIG. 1.
Figure 4:
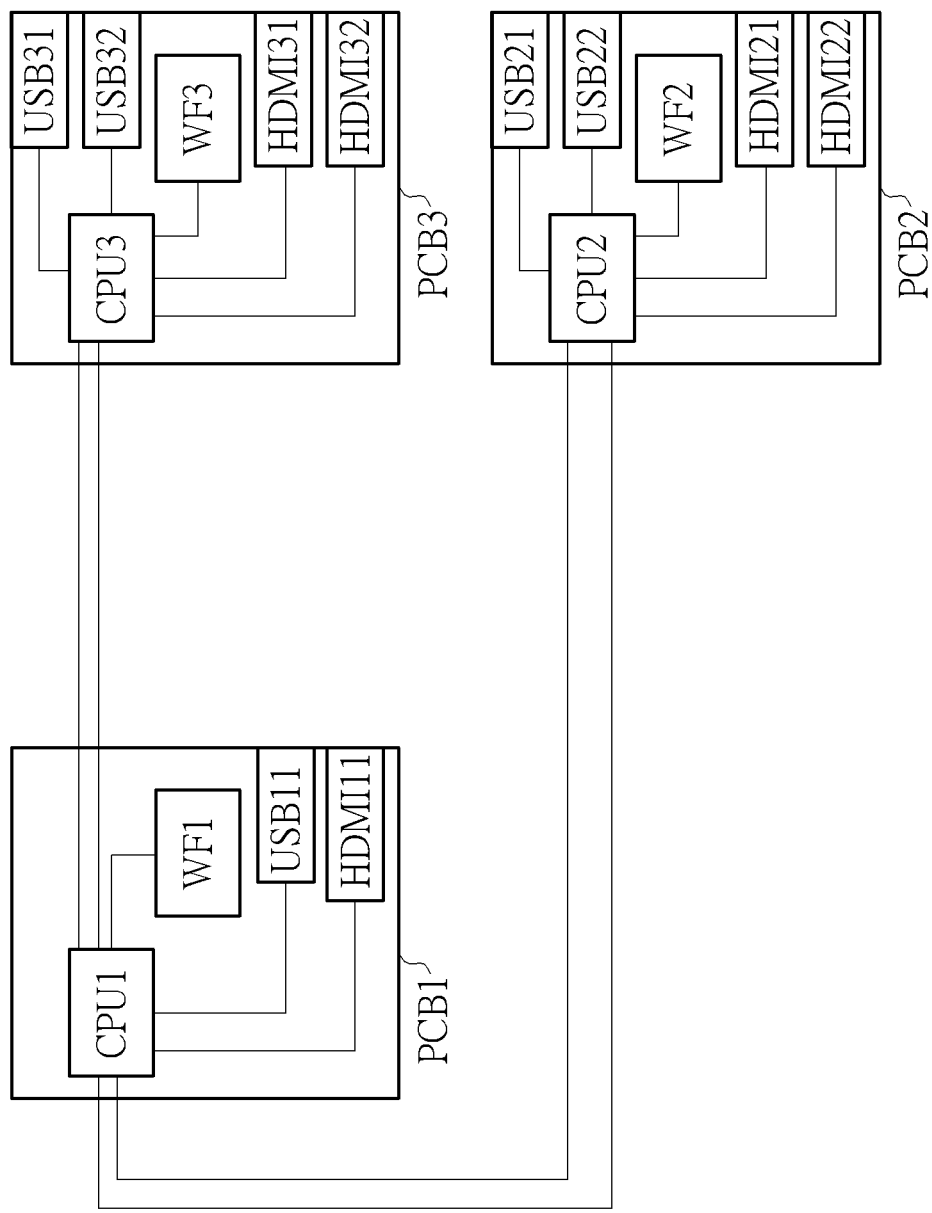
FIG. 4 is an illustration of a second data transmission mode of the conference system capable of expanding functions by introducing additional circuit board in FIG. 1.

FIG. 3 is an illustration of a first data transmission mode of the conference system 100 capable of expanding functions by introducing an additional circuit board. FIG. 4 is an illustration of a second data transmission mode of the conference system 100 capable of expanding functions by introducing the additional circuit board. The additional circuit board in FIG. 3 and FIG. 4 is called as a third circuit board PCB3 hereafter. In FIG. 3, the first circuit board PCB1, the second circuit board PCB2, and the third circuit board PCB3 can be coupled in series. In other words, the third circuit board PCB3 can be coupled to the first circuit board PCB1. The second circuit board PCB2 can be coupled to the first circuit board PCB1 through the third circuit board PCB3. In FIG. 4, the second circuit board PCB2 and the third circuit board PCB3 can be coupled to the first circuit board PCB1. Particularly, in FIG. 4, since the second circuit board PCB2 and the third circuit board PCB3 are coupled to the first circuit board PCB1, the first circuit board PCB1 is capable of expanding at least two hardware functions. Further, in FIG. 4, an operation mode between the first circuit board PCB1 and the third circuit board PCB3 is similar to an operation mode between the first circuit board PCB1 and the second circuit board PCB2. Thus, details are omitted here. In FIG. 3, since the third circuit board PCB3 is coupled to the first circuit board PCB1 and the second circuit board PCB2, the third circuit board PCB3 can perform a function of delaying data. For example, after the second communication module WF2 of the second circuit board PCB2 unpacks and acquires the first compressed media data, the first processor CPU1 of the first circuit board PCB1 can receive the first compressed media data relayed by the third circuit board PCB3 from the second circuit board PCB2 through the data channel. Further, in FIG. 3 and FIG. 4, a structure of the third circuit board PCB3 is similar to a structure of the second circuit board PCB2. For example, the second circuit board PCB2 includes the first media output port HDMI21 and the second media output port HDMI22. The first processor CPU1 transmits the first media contents and the second media contents to the second processor CPU2 after the first processor CPU1 receives the first media contents and the second media contents. Then, the second processor CPU2 transmits the first media contents or the second media contents to the first media output port HDM21 and/or the second media output port HDMI22. Similarly, the third circuit board PCB3 can include a fourth media output port HDMI31 and a fifth media output port HDMI32. After the first media contents and the second media contents are acquired, the first processor CPU1 can transmit the first media contents and the second media contents to the third processor CPU3. Then, the third processor CPU3 can transmit the first media contents or the second media contents to the fourth media output port HDMI31 and/or the fifth media output port HDMI32. In another embodiment, the second circuit board PCB2 is capable of expanding a wireless network function, such as expanding a function of Wi-Fi 6 protocol commutations. Therefore, the second circuit board PCB2 can be used for upgrading hardware functions of the first communication module WF1 in the first circuit board PCB1. The third circuit board PCB3 can be regarded as a circuit board capable of expanding output ports. For example, the third circuit board PCB3 has a plurality of HDMI ports. Therefore, when the third circuit board PCB3 and the first circuit board PCB1 are coupled, compatibility of output ports of the first circuit board PCB1 can be increased. Further, the second circuit board PCB2 and the third circuit board PCB3 have independent processors, or can share one processor. The shared processor can be disposed on the second circuit board PCB2 or the third circuit board PCB3. In other words, in the conference system 100, when the user wants to expand the hardware functions, at least one additional circuit board capable of expanding the hardware functions can be introduced. The basic circuit board only needs to perform a decompressing or a decoding function. Therefore, the conference system 100 can perform various hardware functions or computing functions.

Further, the hardware structure of the second circuit board PCB2 of the conference system 100 can also be reasonably modified. For example, the second circuit board PCB2 can include an audio/video separation module. The audio/video separation module can be a hardware circuit coupled to the second processor CPU2, or can be a software program executed by the second processor CPU2. The second circuit board PCB2 can further include a video output port and an audio output port. The video output port and the audio output port can be coupled to the audio/video separation module. The audio/video separation module can be used for separating audio data and video data from any media data. For example, after the first processor CPU1 acquires the first media content, the first processor CPU1 can use the audio/video separation module for generate first video data and the first audio data. After the first video data and the first audio data are generated, the audio/video separation module can transmit the first video data to the video output port. Further, the audio/video separation module can transmit the first audio data to the audio output port. Alternatively, after the first video data and the first audio data are generated, the conference system 100 can block the first video data or the first audio data according to user's configurations, thereby providing a black screen mode or a mute mode.

Figure 5:
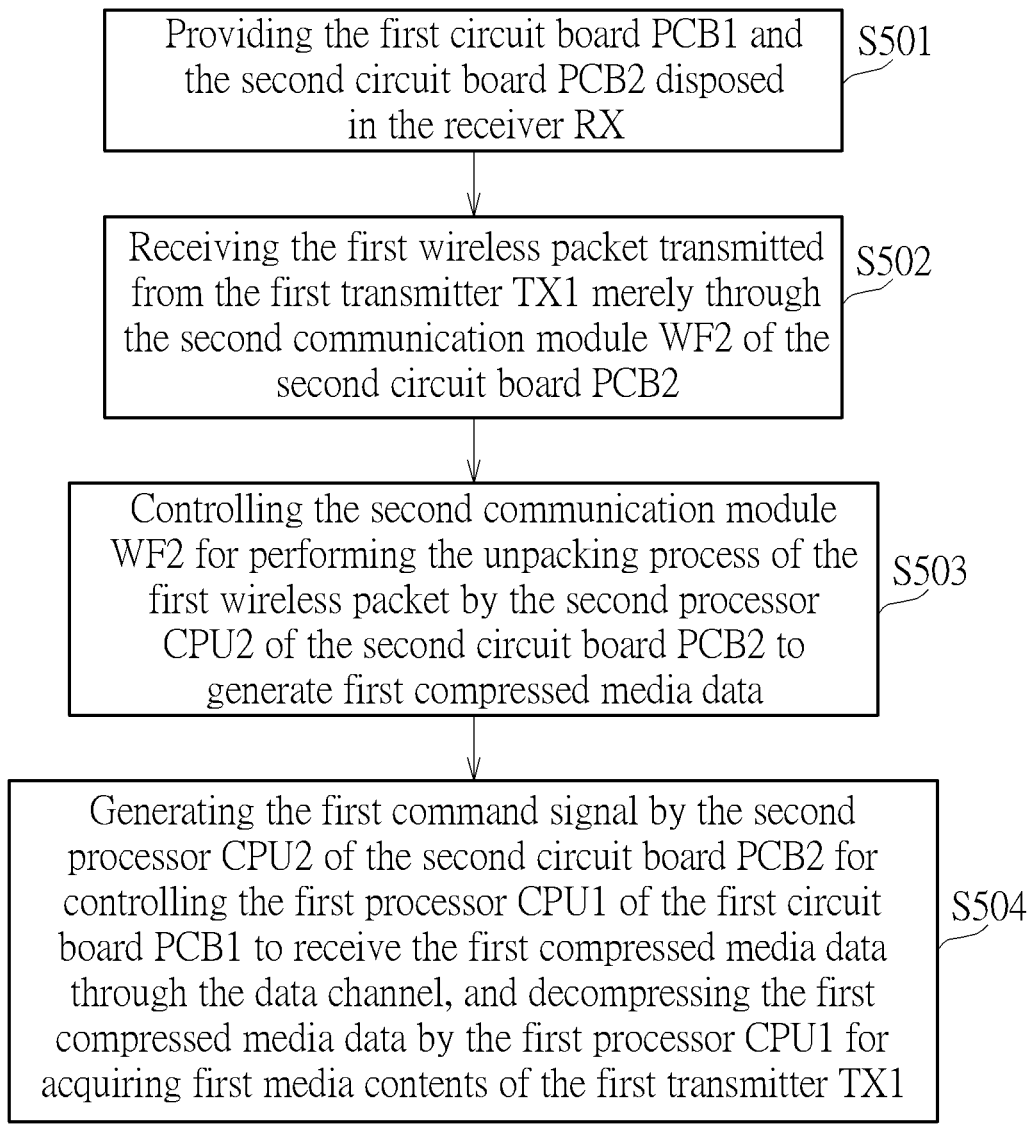
FIG. 5 is a flow chart of a method for expanding functions performed by the conference system in FIG. 1.

FIG. 5 is a flow chart of a method for expanding functions performed by the conference system 100. The method for expanding functions includes step S501 to step S504. Step S501 to step S504 are illustrated below.

Step S501: providing the first circuit board PCB1 and the second circuit board PCB2 disposed in the receiver RX;

Step S502: receiving the first wireless packet transmitted from the first transmitter TX1 merely through the second communication module WF2 of the second circuit board PCB2;

Step S503: controlling the second communication module WF2 for performing the unpacking process of the first wireless packet by the second processor CPU2 of the second circuit board PCB2 to generate first compressed media data;

Step S504: generating the first command signal by the second processor CPU2 of the second circuit board PCB2 for controlling the first processor CPU1 of the first circuit board PCB1 to receive the first compressed media data through the data channel, and decompressing the first compressed media data by the first processor CPU1 for acquiring first media contents of the first transmitter TX1.

Details of the step S501 to step S504 are previously illustrated. Thus, they are omitted here. In the conference system 100, since at least one additional circuit board capable of expanding the hardware functions can be introduced, the first circuit board PCB1 only needs to perform the decompressing or the decoding function. Therefore, the conference system 100 can use an intuitive method for expanding hardware functions.

To sum up, the present invention discloses a conference system capable of expanding functions. The receiver of the conference system includes a circuit board capable of executing basic hardware functions and a circuit board capable of expanding advanced hardware functions. In the conference system, when the user wants to expand the hardware functions, since at least one additional circuit board capable of expanding the hardware functions can be introduced, the basic circuit board only needs to perform the decompressing or the decoding function. Therefore, the conference system can perform various hardware functions or computing functions.

Those skilled in the art will readily observe that numerous modifications and alterations of the device and method can be made while retaining the teachings of the invention. Accordingly, the above disclosure should be construed as limited only by the metes and bounds of the appended claims.

What is claimed is:

1. A method for expanding functions of a conference system, the conference system comprising a first transmitter and a receiver coupled to the first transmitter, the method comprising:
providing a first circuit board and a second circuit board disposed in the receiver;
receiving a first wireless packet transmitted from the first transmitter merely through a second communication module of the second circuit board;
controlling the second communication module for performing an unpacking process of the first wireless packet by a second processor of the second circuit board to generate first compressed media data;
generating a first command signal by the second processor of the second circuit board for controlling a first processor of the first circuit board to receive the first compressed media data relayed by a third circuit board from the second circuit board through a data channel;
decompressing the first compressed media data by the first processor for acquiring first media contents of the first transmitter;
transmitting the first media contents from the first processor of the first circuit board to the second processor of the second circuit board through the third circuit board;
processing the first media contents by the second processor of the second circuit board for generating processed media contents; and
transmitting the processed media contents from the second processor of the second circuit board to the first processor of the first circuit board through the third circuit board;
wherein the first circuit board and the second circuit board are two separate circuit boards before being coupled, the third circuit board is used for expanding output ports, and the third circuit board is coupled to the first circuit board and the second circuit board.

2. The method of claim 1, further comprising:
receiving a second wireless packet transmitted from a second transmitter merely through the second communication module of the second circuit board;
controlling the second communication module for performing the unpacking process of the second wireless packet by the second processor of the second circuit board to generate second compressed media data;
generating a second command signal by the second processor of the second circuit board for controlling the first processor of the first circuit board to receive the second compressed media data through the data channel; and
decompressing the second compressed media data by the first processor for acquiring second media contents of the second transmitter.

3. The method of claim 2, further comprising:
executing an image splitting or composing process for generating composite media contents by the first processor according to the first media contents and the second media contents after the first processor receives the first media contents and the second media contents.

4. The method of claim 2, further comprising:
transmitting the first media contents and the second media contents from the first processor to the second processor after the first processor receives the first media contents and the second media contents; and
executing an image splitting or composing process for generating composite media contents by the second processor according to the first media contents and the second media contents after the second processor receives the first media contents and the second media contents.

5. The method of claim 2, further comprising:
transmitting the first media contents and the second media contents from the first processor to the second processor after the first processor receives the first media contents and the second media contents; and
transmitting the first media contents or the second media contents from the second processor to a first media output port or a second media output port;
wherein the second circuit board comprises the first media output port and the second media output port.

6. The method of claim 1, wherein the second communication module of the second circuit board supports a second wireless communication specification, the first communication module of the first circuit board supports a first wireless communication specification, and bandwidth utilization of the second wireless communication specification is superior to the first wireless communication specification.

7. The method of claim 1, wherein the first circuit board is not compatible with a wireless communication function.

8. The method of claim 1, further comprising:
coupling the first circuit board and the second circuit board for generating a command channel and a data channel;
wherein the second circuit board comprises a first media output port and a second media output port, and the first circuit board comprises a third media output port and a data output port.

9. The method of claim 1, wherein the first circuit board is a circuit board having basic functions, the second circuit board is a circuit board having advanced functions, and a clock frequency of the first processor is larger than a clock frequency of the second processor.

10. A conference system capable of expanding functions comprising:
a first circuit board comprising:
a first processor;
a second circuit board coupled to the first circuit board, the second circuit board comprising:
a second communication module; and
a second processor coupled to the second communication module;
a third circuit board coupled to the first circuit board and the second circuit board; and
a first transmitter coupled to the second circuit board;
wherein the first circuit board and the second circuit board are disposed in a receiver, the second circuit board receives a first wireless packet transmitted from the first transmitter merely through a second communication module, the second processor of the second circuit board controls the second communication module for performing an unpacking process of the first wireless packet to generate first compressed media data, the second processor of the second circuit board generates a first command signal for controlling the first processor of the first circuit board to receive the first compressed media data relayed by the third circuit board from the second circuit board through a data channel, the third circuit board is used for expanding output ports, the first processor decompresses the first compressed media data for acquiring first media contents of the first transmitter, the first media contents are transmitted from the first processor of the first circuit board to the second processor of the second circuit board through the third circuit board, the first media contents are processed by the second processor of the second circuit board for generating processed media contents, the processed media contents are transmitted from the second processor of the second circuit board to the first processor of the first circuit board through the third circuit board, and the first circuit board and the second circuit board are two separate circuit boards before being coupled.

11. The system of claim 10, further comprising:
a second transmitter coupled to the second circuit board;
wherein the second circuit board receives a second wireless packet transmitted from a second transmitter merely through the second communication module, the second processor of the second circuit board controls the second communication module for performing the unpacking process of the second wireless packet to generate second compressed media data, the second processor of the second circuit board generates a second command signal for controlling the first processor of the first circuit board to receive the second compressed media data through the data channel, and the first processor decompresses the second compressed media data for acquiring second media contents of the second transmitter.

12. The system of claim 11, wherein the first processor executes an image splitting or composing process for generating composite media contents according to the first media contents and the second media contents after the first processor receives the first media contents and the second media contents.

13. The system of claim 11, wherein the first processor transmits the first media contents and the second media contents to the second processor after the first processor receives the first media contents and the second media contents, and the second processor executes an image splitting or composing process for generating composite media contents according to the first media contents and the second media contents after the second processor receives the first media contents and the second media contents.

14. The system of claim 11, wherein the second circuit board further comprises a first media output port and a second media output port, the first processor transmits the first media contents and the second media contents to the second processor after the first processor receives the first media contents and the second media contents, and the second processor transmits the first media contents or the second media contents to the first media output port or the second media output port.

15. The system of claim 10, wherein the first circuit board further comprises a first communication module, the first communication module is coupled to the first processor, the second communication module of the second circuit board supports a second wireless communication specification, the first communication module of the first circuit board supports a first wireless communication specification, and bandwidth utilization of the second wireless communication specification is superior to the first wireless communication specification.

16. The system of claim 10, wherein the first circuit board is not compatible with a wireless communication function.

17. The system of claim 10, wherein a command channel and a data channel are generated after the first circuit board and the second circuit board are coupled, the second circuit board further comprises a first media output port and a second media output port, the first media output port and the second media output port are coupled to the second processor, the first circuit board comprises a third media output port and a data output port, and the third media output port and the data output port are coupled to the first processor.

18. The system of claim 10, wherein the first circuit board is a circuit board having basic functions, the second circuit board is a circuit board having advanced functions, and a clock frequency of the first processor is larger than a clock frequency of the second processor.

* * * * *